Fig. 1

United States Patent Office 3,756,884
Patented Sept. 4, 1973

3,756,884
PROCESS AND APPARATUS FOR PRODUCING
LAMINATED STRUCTURE HAVING HOLLOW
CLOSED CELLS
Seigi Hagino, Nagoya, Japan, assignor to Mitsui Petrochemical Industries, Ltd., Tokyo, Japan
Filed Dec. 21, 1971, Ser. No. 210,333
Claims priority, application Japan, Dec. 21, 1970,
45/115,999
Int. Cl. B31f 1/20
U.S. Cl. 156—145    11 Claims

ABSTRACT OF THE DISCLOSURE

Improved process for producing a laminated structure having hollow closed cells and an apparatus therefor, characterized in that a molding rotary roll is loosely fitted to a hollow support roll provided in the inside thereof, and the molding roll is intimately contacted with the support roll at the position of a pressure-reduction chamber by a balancing roll, which cooperates with a bonding roll, and thus molding member can be readily exchanged.

---

This invention relates to an improved method and an improved apparatus for producing a laminated structure having hollow closed cells.

There has previously been known an apparatus for producing a laminated structure having hollow closed cells, comprising a molding rotary roll having on its periphery a plurality of gas-permeable cavities for imparting an embossed pattern to a first film of a thermoplastic resin in the heat-softened state and including therein a pressure-reduction chamber for sucking a gas into the inside of the roll through said cavities and a pressure-reduction passageway for conducting the sucked gas from the pressure-reduction chamber into outside the roll; a bonding rotary roll for bonding a second film of a thermoplastic resin in the heat-softened state to said first film molded on said molding roll thereby to form a laminated structure having hollow closed cells, and a guide roll for guiding the laminated structure removed from said molding roll at a position past the bonding roll (U.S. Patent 3,-142,599, British Patents 978,654, 942,214, and 942,215).

Laminated structures having hollow closed cells can be produced continuously using an apparatus of this kind, but improvements have been desired in respect of the molding speed, the shape stability of the formed hollow closed cells, etc. The apparatus further does not include a simple mechanism for exchanging only a molding member having a plurality of gas-permeable cavities on its periphery in the event that it is desired to give a different embossed pattern to the resulting laminated structure. Hence, in such an apparatus, complicated and difficult disassembling and assembling operations are required, or it is necessary to provide a separate apparatus having another desired embossed pattern. This is disadvantageous both in operation and in cost.

A primary object of this invention is to provide an improved method and an improved apparatus for producing a laminated structure having hollow closed cells at low cost at improved molding speeds and with exact embossing, wherein the molding member can be exchanged by a simple operation without involving the above-mentioned disadvantages.

Another object of this invention includes other improvements such as the cooling of the laminated structure formed on the molding roll, the cooling of the molding roll, the drying of the roll, and the removal of the laminated structure from the roll.

Many other objects and advantages of this invention will become apparent from the following description.

The invention will be described in detail with reference to the accompanying drawing in which:

FIG. 1 is a schematic side elevation in vertical section of one example of the apparatus of the invention;

FIG. 3–1 and FIG. 3–2 are perspective views showing examples of the resulting laminated structure having hollow closed cells; and FIG. 3–3 is a sectional view showing one example of a laminated structure having hollow closed cells obtained by melt-adhering a third film of a flat thermoplastic resin to the cell arranged surface of said laminated structure.

Figures 1, 3:
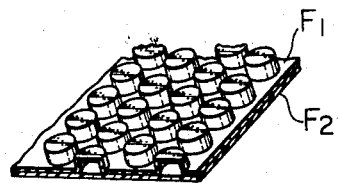

FIG. 1 illustrates one example of an apparatus of the invention suitable for production of a laminated structure having hollow closed cells utilizing a film still in the heat-softened state extruded from an extruder E having a die D with nozzles $d_1$, $d_2$, $d_3$ for molding a thermoplastic synthetic resin film. Of course, it is possible to heat films already prepared by other methods to a sufficiently softened state for use in the present invention. In the apparatus shown in FIGS. 1 and 2, the molding roll is provided horizontally with respect to its axial direction, but it will be obvious to those skilled in the art to make a design change, and provide the molding roll either in a perpendicular direction or in a direction across the horizontal direction. Furthermore, in FIG. 1, the apparatus is suited for production of a laminated structure of the type wherein the first film $F_1$ and second film $F_2$, such as shown in FIG. 3–3 for example, are bonded to each other, and then third film $F_3$ is bonded to a side opposite to the film $F_2$. Where it is desired to obtain a laminated structure of the type shown in FIGS. 3–1 and 3–2, the apparatus, of course, does not require means for bonding third film $F_3$. An example of this type of the apparatus is shown in FIG. 2.

Figures 2, 3:
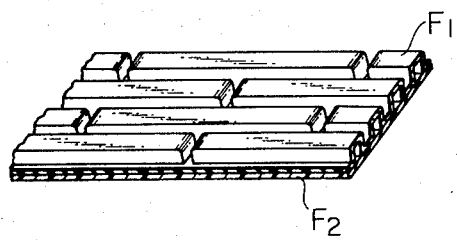
Figure 3:
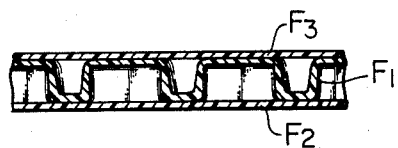
Figure 2:
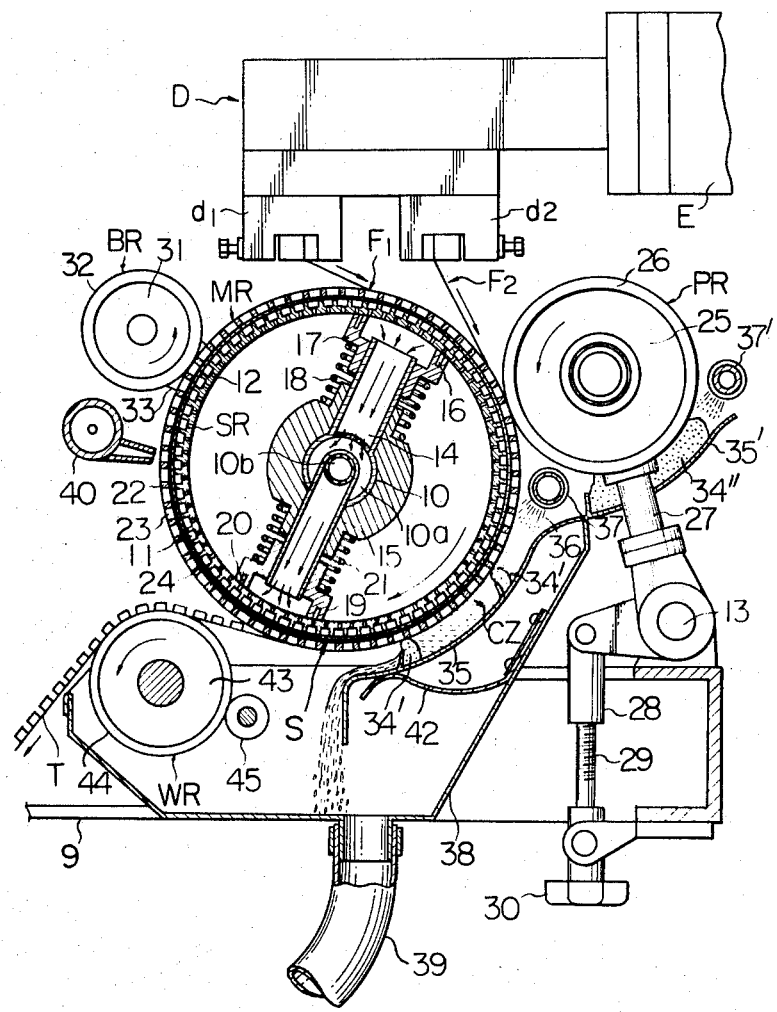
FIG. 2 is a schematic side elevation in vertical section of another example of the apparatus of the invention.

Referring to FIGS. 1 and 2, molding roll MR is loosely fitted to a hollow support roll SR provided inside thereof, and the radius of said roll SR is somewhat smaller than that of roll MR. The degree of difference has to do with the radius of roll SR, and cannot be determined unequivocally. For practical purposes, the inner radius of the molding roll MR is about 5 cm. to about 100 cm., the outer radius of the hollow support roll SR is such that the ratio of the inner radius of roll MR to the outer radius of roll SR is about from 1.005 to 5. The ratio of the inner radius of roll MR to the outer radius of roll SR may be selected within the above-mentioned range, and in a way such that at a position at least corresponding to a presure-reduction chamber 17 between a point in the molding roll MR to which a first film has been introduced, and a point on bonding roll PR at which the film has arrived, the roll MR should be substantially in close contact with the roll SR. Preferably, the inner radius of the molding roll should be 7.5 to 50 cm., and the ratio of the inner radius of the roll MR to the outer radius of the roll SR is from 1.01 to 2. The radius ratio MR/SR may also be selected so that the roll SR substantially comes in contact with, for example, ½ to ¾ of the periphery of the roll MR including said position corresponding to the pressure-reduction chamber 17.

As is shown in FIGS. 1 and 2, the present invention provides an apparatus for producing a laminated structure having hollow closed cells including a molding roll, a bonding roll, and a guide roll, in which the molding roll MR is loosely fitted to the surface of a hollow support roll SR provided in its inside. At any position from a point of roll MR to which first film $F_1$ has been introduced to a point of the bonding roll PR at which the film $F_1$ has arrived, the pressure-reduction chamber 17 is provided in contact with the inner wall of said hollow support roll SR and fixedly to a pressure-reduction passageway 14 in a manner such as to permit passage of said roll SR therethrough slidably. Furthermore, a balancing rotary roll BR is provided in contact with said molding roll MR, which balancing roll cooperates with the bonding roll PR to bring the hollow support roll SR into intimate contact with the molding roll MR loosely fitted to the roll SR at the position of said pressure-reduction chamber. The number of rolls BR and the positions can be changed as desired. Since the roll MR is loosely fitted to the roll SR with a proper allowance, an arc-like space S of narrow width is formed, as shown in FIGS. 1 and 2, on a side opposite to the intimately contacting side.

Preferably, a cooling means CZ is provided at a position past the bonding roll PR and before the removal of the resulting laminated structure from the roll MR. This cooling means solidifies the laminated structure formed on the molding roll MR by cooling to maintain its shape, and permits easy removal of the structure from the roll MR, and also cools the roll MR.

In FIGS. 1 and 2, the pressure-reduction chamber 17 is connected to a shaft 10 of the support roll SR by means of the pressure-reduction passageway. Sucked gas is exhausted out of the roll SR through a passageway 10a provided within said shaft. If desired, sucked gas can be discharged from other place by a means known per se.

A cooling medium jetting chamber 20 which is in contact with the inner wall of said hollow support roll at a portion of said roll MR from which the laminated structure is removed or in the vicinity of that portion but before complete removal of said laminated structure from the roll MR is provided fixedly to a passage 15 for a cooling medium such as cold air or cold water. The shaft 10 of the support roll SR is connected to the passage 15, and via the shaft 10, the cooling medium can be fed into the chamber 20. The chamber 20 functions to cool the support roll SR, assist the smooth removal of the laminated structure from the roll MR, and cool said structure also from the side of first film $F_1$, that is the opposite side of said cooling means CZ, through gas-permeable apertures at the bottoms of a plurality of gas-permeable cavities.

When a suction gas exhausting means is provided so that the gas is taken through the gas-permeable cavities via the pressure-reduction chamber 17 with the pressure-reduction passage 14 connected to the shaft 10, it is possible to build up the shaft 10 of the roll SR in a double tube structure, one of the hollow parts being used as a suction gas exhausting passage, the other being used as a passage for feeding a cooling medium to the chamber 20. This is a preferred construction. Of course, other passages for feeding a cooling medium may be provided, and if desired, the suction gas exhausting passage and the cooling medium feeding passage may be provided without utilizing the shaft 10.

The presence of an arc-like slit or space S of narrow width or thickness is helpful for cooling the laminated structure from the side of the first film $F_1$, that is, from a side opposite to said cooling means CZ. This increases the advantage of the apparatus of the present invention in conjunction with the ease of exchange of roll MR as a result of loose fitting of the roll MR on the roll SR. Furthermore, the arc-like slit S serves for exerting an exect of cooling the laminated structure from the inside of the roll MR on a broad area of the inner surface of the roll MR.

Again, referring to FIGS. 1 and 2, the roll MR is loosely fitted to the roll SR having a double hollow unit shaft 10 mounted on a machine frame 9. The hollow support roll SR has a number of flow channels 11 for instance on the outer periphery thereof, and also includes a number of flow channels 12 which make them communicate with the interior of the hollow portion of the roll SR. The shaft 10 includes the presure-reduction passage 14 and the cooling medium passage 15. One or both of these passages may be fixed to the shaft 10 so as to be rotatable about the shaft 10. Thus, according to need, the relative positions of the pressure-reduction passage 14 and the cooling medium passage 15 can be changed by changing the angle formed between the pressure-reduction passage 14 and the cooling medium jetting chamber 20. Thus, in case of need, the relative positions of sucking a film fed and removing the resulting laminated structure can be changed.

Chambers 17 and 20 are respectively brought into intimate contact with the inner wall of the support roll SR by means of springs 18 and 21 so that the roll SR can pass there slidably. In place of the spring, other means can be employed which permits the passing of the support roll SR slidably with these chambers. For example, the pipes of the passages 14 and 15 may be changed to expandable pipes. In the drawings, these chambers are lip-sealed by packings 16 and 19. The above intimate contacting can be achieved by any other known means such as roller sealing or liquid sealing. If the sealing effect is good, the use of the springs can be omitted. Instead, the chambers 17 and 20 are directly connected to the passages 14 and 15, and can be set at the desired positions only by the sealing means, without any fear of impeding the rotation of the roll SR rotating with the roll MR, or causing loss of sealing.

The molding roll MR and the support roll SR may be made of a thermally stable material such as stainless steel, brass, other metal materials, reinforced thermally stable plastics, or thermally stable synthetic rubbers. The body 22 of the molding roll MR has a plurality of gas-permeable cavities on its periphery for imparting a desired embossed pattern to a first film of a thermoplastic resin in the heat-softened state. By providing rolls MR having cavities of various embossed patterns, the desired pattern can be embossed on the film by exchanging the roll MR with the desired one. The outer peripheral surface of the roll SR is covered with such a material as wire mesh, gas-permeable sintered metal plates, thermally stable fabrics, fabrics rendered heat-stable, nets made of thermally stable synthetic resins, heat-resistant non-woven fabrics, or thin metal sheets having a number of small pores, and this material constitutes the bottoms of the cavities. If desired, the cavities of the roll MR itself may include separate small pores at the bottoms for the passage of gas. The presence of such a gas-permeable layer on the surface at which the roll MR and the roll SR can contact each other serves to ensure the synchronous rotation of the roll MR and the roll SR.

The rotation of the roll MR may be performed by friction between the roll MR and the roll SR caused by rotating the roll SR with the provision of one or a plurlity of drive rolls provided in contact with the inner wall of the roll SR which drive rolls have a surface with a large coefficient of friction. It may be effected by providing a drive gear at a suitable part of the outer end of the roll SR, forming a gear on a suitable part of the roll MR which meshes with the gear on the roll SR and rotating the roll SR. A similar gear mechanism may be provided in the body 22 of the roll MR on the edge in the axially extending direction, and the roll SR is also rotated thereby to rotate both of them synchronously. It is also possible to rotate the roll MR by the above gear mechanism, and the roll SR can be rotated incident to this. Furthermore, it is also possible to give an assisting rotating action to the roll MR using the balancing roll BR as a drive roll.

The bonding roll PR may be rotatably supported by a suitable means, and is made of, for instance, a core roll 25 and a rubbery elastic layer 26 provided in its outer periphery. For example, a support arm 27 for rotatably supporting the core roll 25 is secured to the machine frame 9 via a pin 13 in a manner such as to control the angle inclination freely. A screw rod 29 is threaded into a screw cylinder 28 connected to the support arm 27, and a handle 30 is fitted. Thus, the bonding roll can be rotated with the pin 13 as an axis. It is preferred that the bonding roll PR should have a cooling means adapted to cool the roll from exterior and interior.

The balancing roll BR is made of, for example, a core roll 31 and a rubbery elastic layer 32. A support arm 33 for rotatably supporting the core roll 31 is fixed to the outer end of a hollow double shaft 10 of the molding roll MR so as to be moved up and down. It is preferred that said laminated structure should be cooled at a position past the roll PR and before the removal of the laminated structure from the molding roll. Cooling can be performed by blowing a cooling gas medium, but the use of a liquid cooling medium, such as water, is especially preferred. The liquid cooling medium may for example be sprayed onto the laminated structure from a number of shower pipes arranged in series and having a number of small apertures directed towards the curved surface of the roll MR for example. In place of the shower pipes, a water jacket curved along the curved surface of the roll MR may be provided, and a number of small apertures are provided on the surface facing the roll MR. Cooling means of the types shown in FIGS. 1 and 2 can also be used preferably.

In the cooling means CZ shown in FIG. 1, a mat 34 of a flexible material such as felt or sponge which comes into contact with the surface of the roll MR at a moderate pressure is accommodated in a receiving trough 35 provided with a spring plate 42. At the upper portion of the mat 34, a water-pouring pipe 37 provided with a hole 36 for supplying a liquid cooling medium such as water is provided. By opening or closing a cock 40, a proper amount of water can be supplied to the upper portion of the mat 34. The cooling medium flows while beinb impregnated in the mat 34, and discharged from a drainage pipe 39 disposed at the bottom of a water discharging box 38.

In the cooling means CZ shown in FIG. 2, a mass of mat 34' of felt, sponge, polyurethane foam, etc. is supported by a dam plate provided at a suitable position of the receiving trough 35, and a cooling medium dam is formed between it and the roll MR. Water flows over this damming member.

In FIGS. 1 and 2, the guide roll for guiding the laminated structure removed from the molding roll MR constitutes a water removing roll WR, having connection with the cooling means CZ utilizing a liquid cooling medium. This roll WR is constructed of a core roll 43 and a layer 44 made of a water-absorbing material such as felt, sponge, or polyurethane foam, and a squeezing roll 45 is provided rotatably so as to press this water-absorbing layer 44. As shown in FIG. 2, it is preferred to provide a dryer 40 for drying the surface of said roll in proximity to the molding roll MR at a position after removal of the laminated structure from the roll MR and before a position of the molding roll MR to which the first film has been introduced. The dryer 40 can be supported by an arm (not shown) mounted on the outer end of the shaft 10 similarly to the case of the supporting arm 33 for the balancing roll BR. When a liquid cooling medium such as water is used in the chamber 20 already described, a similar dryer can be provided within the roll SR in a manner directed to the inner wall of the roll SR, and supported by the roll shaft 10. A stream of drying gas can be fed, for instance, through the shaft 10 (for example, this can be constructed in a triple-tube structure).

For production of a laminated structure of the type shown in FIG. 3-3, a mechanism for melt-adhering a third film $F_3$ such as shown in FIG. 1 may be provided as attachment to the machine frame 9.

In FIG. 1, the laminated structure T removed from the molding roll MR is guided by a suitable guide roll GR so that its second film side comes into contact with the surface of the heating roll HR. FIG. 1 shows an embodiment wherein utilizing the water-removing roll WR, which is suitable for the case of using a liquid cooling medium as the cooling fluid, as a guide roll, the laminated structure is guided to the heating roll HR by the roll GR and the roll WR. If desired, a drying means such as the dryer 40 shown in FIG. 2 is provided at any desired point up to the guiding of the laminated structure removed from the roll MR to the heating roll HR. This can serve to dry and remove a liquid that may be adhered to the embossed first film when a liquid is used as the cooling medium to be jetted out from the chamber 20.

The heating roll HR is heated from outside by an infrared heater, etc., and includes an internal heater 49 such as electric heaters, heated oil, or steam within a roll body 48 to maintain the roll at the desired temperature. An exterior heating member 50 such as infrared heaters or infrared lamps is provided on the periphery of the roll body 48 in the circumferential direction. At this time, it is preferable to mount the heating member 50 to a cover 51.

The guide roll GR and the take-up modifying roll CR may be ordinary rolls. As regards the roll CR, it is preferred to provide several sets of rolls in series in the advancing direction, each roll set consisting of opposing upper and lower rolls.

An internally cooled melt-adhering hollow roll DR rotatably via said laminated structure and said third film $F_3$ is provided at a position past the heating member 50 of the heating roll HR which is provided with the exterior heating member 50 for heating the laminated structure from outside the roll and is internally heated, in order to melt-adhere the third film of a thermoplastic resin to said laminated structure. Preferably, the melt-adhering roll DR is cooled by a suitable fluid cooling medium, such as cooling water through cooling of the interior of said hollow roll DR. Especially preferably, the shaft 46 of the roll DR is constructed in a double-tube structure, and a cooling medium is introduced into the roll body 47 via one of the hollow parts of the shaft, for example 46a, and discharged out of the roll body 47 through the other passage 46b.

Now, the method of producing a laminated structure of the type shown in FIGS. 3-1 and 3-2 from first film $F_1$ and second film $F_2$, and a laminated structure of the type shown in FIG. 3-3 further comprising third film $F_3$ will be described with reference to FIGS. 2 and 1, respectively.

In FIG. 2, the first film $F_1$ of a thermoplastic resin as extruded and being in the heat-softened state is introduced to the surface of the molding roll MR, and brought into intimate contact with the roll MR by suction from the pressure-reduction chamber 17 through the cavities 23 of the roll MR, and the support roll SR having flow channels 11 and flow openings 12. The film moves to the bonding roll PR by the rotation of the roll MR while being molded in an embossed pattern corresponding to the shapes of the plurality of cavities. At a suitable position before arrival at the roll PR, a similar second film $F_2$ is conducted to the molded first film, and both films are bonded by the bonding roll. FIG. 2 shows an embodiment wherein the bonding roll PR is exteriorly cooled by a cooling means comprising a receiving trough 35', a water-absorbing mat 34" and a water-supply pipe 37', same as mentioned with respect to the cooling means CZ shown in FIG. 1.

The laminated structure formed on the molding roll MR is cooled together with the roll MR, while being carried by the roll MR over a cooling water damming area of the cooling means CZ. Then, the laminated structure is cooled from the first film side also by a fluid cooling medium flowing from the interior of the roll SR through the support roll SR having flow channels 11 and flow openings 12 and the cavities of the roll 1 MR. At this time, arc-like slit or space S formed by the loose fitting of the roll MR to the roll SR renders the cooling from the inside of the roll MR more effective. Furthermore, this flowing cooling medium permits easy and exact removal of the laminated structure from the roll MR, and also obviates any deformation of the structure upon removal.

The laminated structure removed from the roll MR is removed free of water drops, etc. via the water-removing roll WR and if desired, the adhering water drops are further removed by a dryer (not shown) similar to the dryer 40 from the first film side also. Thus, the desired laminated structure can be obtained from the films $F_1$ and $F_2$.

A third film $F_3$ can be melt-adhered to the first film side of the resulting structure. In FIG. 1, the laminated structure T guided from the molding roll MR to a removed position is guided on the roll GR, and guided so that its second film side comes into contact with the surface of the heating roll HR. The laminated structure is heated both by the exterior heating member 50 and an internal heating element of the heating roll HR, and to the first film side of the laminated structure is adhered a third film $F_3$ in the fully heat-softened state as extruded from a nozzle $d_3$ of die D, through the internally cooled melt-adhering roll DR already described. Undesirable deformations such as warping or curving of the first, second and third films at the time of melt-adhering the third film can be conveniently avoided.

The laminated structure obtained of the type shown in FIG. 3–3 is taken by roll CR, and fed to a cutting device with good surface smoothness and with the prevention of warping. If required, a suitable tension is exerted by the rolls CR on the laminated structure consisting of the first, second, and third films to avoid the deformation of the laminated structure.

According to the apparatus of the invention, the lamination strength, transparency, luster, or other quality of the product can be improved. In addition, the speed of molding can be increased. The molding speed can be made greater when the apparatus includes an exterior cooling means using a liquid medium and a chamber for jetting out a cooling medium provided in the inner wall of the support roll, and moreover, an improved quality of the product can be expected. Since, the molding roll is loosely fitted to the support roll, the molding roll can be easily exchanged with another molding roll of a desired embossed pattern, and the overall structure of the apparatus can be markedly simplified. Further, the presence of the arc-like slit or space formed by this loose fitting serves to enhance the effect of cooling the laminated structure from the inner wall of the molding roll.

What is claimed is:

1. In an apparatus for producing a laminated structure having hollow closed cells, comprising a molding rotary roll having on its periphery a plurality of gas-permeable cavities for imparting an embossed pattern to a first film of a thermoplastic resin in the heat-softened state and including therein a pressure-reduction chamber for sucking a gas into the inside of the roll through said cavities and a pressure-reduction passage for conducting the sucked gas outside the roll, a bonding rotary roll for bonding a second film of a thermoplastic resin in the heat-softened state to said first film molded on said molding roll thereby to form a laminated structure having hollow closed cells, and a guide roll for guiding the laminated structure removed from said molding roll at a position past the bonding roll, the improvement wherein said molding roll is loosely fitted to a hollow support roll provided in the inside thereof; the pressure-reduction chamber which permits the passage of said support roll slidably at a position between a point on said molding roll to which said first film has been introduced and a point on said bonding roll at which the film has arrived is provided fixedly to the pressure-reduction passage in contact with the inner wall of said hollow support roll; and wherein a balancing rotary roll is provided in contact with said molding roll, which balancing roll cooperates with said bonding roll and bring said hollow support roll into intimate contact with the molding roll loosely fitted on said roll at the position of said pressure-reduction chamber.

2. Apparatus of claim 1, wherein a means for cooling said laminated structure by a fluid cooling medium is provided at a position past said bonding roll and before the removal of the resulting laminated structure from said molding roll.

3. Apparatus of claim 1, wherein said presusre-reduction chamber is connected to the shaft of said support roll by the pressure-reduction passage, and via a passage provided within said shaft, sucked gas is discharged out of said support roll.

4. Apparatus of claim 1, wherein a chamber for jetting out a cooling medium which permits the passage of said support roll slidably is provided fixedly to the cooling medium passage in contact with the inner wall of said hollow support roll at a position before the removal of said laminated structure from said molding roll, the shaft of said support roll is connected to said cooling medium passage, and via said shaft, a cooling medium is fed to said chamber for jetting out the cooling medium.

5. Apparatus of claim 3, wherein the shaft of said support roll is a double hollow shaft with two passageways, one of them being a passageway for exhausting sucked gas.

6. Apparatus of claim 1, wherein a dryer for drying the surface of the molding roll is provided in proximity to said molding roll at a position after the removal of said laminated structure from said molding roll and before a position of said molding roll to which said first film has been introduced.

7. Apparatus of claim 1, wherein said pressure-reduction chamber is connected to one of the passageways of the double hollow shaft of said support roll by the pressure-reduction passage; a cooling medium jetting chamber capable of permitting the slidable passage of said support roll is provided fixedly to the cooling medium passage in contact with the inner wall of said support roll at a position before or at which said laminated structure is removed from said molding roll; said cooling medium passage is connected to the other passage of said double hollow shaft; and said pressure-reduction passageway and said cooling medium passage are fixed to said shaft rotatably about said double hollow shaft.

8. Apparatus of claim 1, which further includes guide means for guiding a laminated structure removed from said molding roll to a heating drive rotary roll; an internally heated roll provided with an exterior heating member adapted to heat said laminated structure on the heating roll from outside the roll; and an internally cooled melt-adhering hollow roll rotatably in contact with said laminated structure via a third film, which roll melt-adheres said third film of a thermoplastic resin in the heat-softened state to said laminated structure at a position past said exterior heating member.

9. Apparatus of claim 8, wherein the shaft of said melt-adhering roll is a double hollow shaft, and a cooling medium is introduced into the inside of the molding roll via one of the passages of the shaft, and discharged through the other passage.

10. In a process for producing a laminated structure having hollow closed cells by introducing a first film of a thermoplastic resin in the heat-softened state to a molding rotary roll having in its periphery a plurality of gas-permeable cavities for imparting an embossed pattern to the first film, sucking a gas into the interior of said molding roll through said cavities thereby to bring the first film into intimate contact with said roll and mold it, introducing a second film in the heat-softened state to the surface of the first film, bonding said second film onto said molded first film by means of a bonding rotary roll, and then removing the laminated structure from said roll, the improvement which comprises introducing said first film into the molding rotary roll loosely fitted to a hollow support roll, sucking gas into the interior of said molding roll through said cavities and said support roll thereby to bring said first film into intimate contact with said molding roll, bonding said second film onto said first film, contacting a fluid cooling medium directly with the resulting laminated structure on said molding roll from the exterior of said roll thereby to cool said structure and molding roll exteriorly, flowing a fluid cooling medium from the inside of said support roll through said support roll and said cavities and concurrently introducing the cooled laminated structure from the molding roll to a removed position; the intimate contact between the inner wall of said molding roll and the outer wall of the support roll at a portion where gas is sucked through the cavities and the support roll in order to bring the first film into intimate contact with the molding roll being performed by the co-operative action of a balancing roll, said bonding roll, said support roll, and said molding roll.

11. A process of claim 10, wherein the laminated structure introduced to a position removed from said molding roll is introduced to an internally heated heating roll with the second film side contacting said heating roll, the structure is exteriorly and interiorly heated by an exterior heating member provided outside said heating roll and a heating element provided in the interior of said heating roll, and then the re-heated laminated structure is introduced so as to come into contact with the internally cooled melt-adhering hollow roll via a third film of a thermoplastic resin in the heat-softened state, and said third film is melt-adhered to the first film side of said laminated structure between said heating roll and the melt-adhering roll.

References Cited

UNITED STATES PATENTS

| | | | |
|---|---|---|---|
| 3,496,043 | 2/1970 | Ragan | 156—210 |
| 3,527,668 | 9/1970 | Kusters et al. | 29—121 R X |
| 3,700,523 | 10/1972 | Sato et al. | 156—210 |

FOREIGN PATENTS

| | | | |
|---|---|---|---|
| 688,108 | 6/1964 | Canada | 156—210 |

ALFRED L. LEAVITT, Primary Examiner

D. A. SIMMONS, Assistant Examiner

U.S. Cl. X.R.

156—199, 243, 244, 285, 292, 471, 498, 501